US012639478B2

(12) United States Patent (10) Patent No.: US 12,639,478 B2
Ryu et al. (45) Date of Patent: May 26, 2026

(54) STORAGE DEVICE HAVING AN RPMB RESET FUNCTION AND RPMB MANAGEMENT METHOD THEREOF

(71) Applicant: Samsung Electronics Co., Ltd., Suwon-si (KR)

(72) Inventors: Jimin Ryu, Suwon-si (KR); Yonghwan Song, Suwon-si (KR); Jaegyu Lee, Suwon-si (KR); Dong-Min Kim, Suwon-si (KR); Byungjune Song, Suwon-si (KR); Myeongjong Lee, Suwon-si (KR); Daejin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 18/189,412

(22) Filed: Mar. 24, 2023

(65) Prior Publication Data

US 2024/0020426 A1     Jan. 18, 2024

(30) Foreign Application Priority Data

Jul. 15, 2022    (KR) ........................ 10-2022-0087699
Oct. 7, 2022    (KR) ........................ 10-2022-0129007

(51) Int. Cl.
 *G06F 21/79* (2013.01)
 *G06F 21/55* (2013.01)
 *G06F 21/60* (2013.01)
(52) U.S. Cl.
 CPC ............ *G06F 21/79* (2013.01); *G06F 21/556* (2013.01); *G06F 21/602* (2013.01)

(58) Field of Classification Search
 CPC ...... G06F 21/79; G06F 21/556; G06F 21/602; G06F 12/1441; G06F 12/1466
 See application file for complete search history.

(56) References Cited

U.S. PATENT DOCUMENTS

| | | | |
|---|---|---|---|
| 7,444,682 B2 | 10/2008 | Li et al. | |
| 10,768,831 B2 | 9/2020 | Keeth et al. | |
| 11,321,468 B2 | 5/2022 | Cariello et al. | |
| 2016/0203086 A1 | 7/2016 | Ng et al. | |
| 2020/0014544 A1 | 1/2020 | Sela et al. | |
| 2021/0203496 A1 | 7/2021 | Cariello et al. | |
| 2021/0234708 A1* | 7/2021 | Van Antwerpen | .... G06F 21/602 |

(Continued)

OTHER PUBLICATIONS

Extended European Search Report corresponding to EP 23171946.9; Dated Nov. 29, 2023, (8 pages).

(Continued)

*Primary Examiner* — Matthew T Henning
(74) *Attorney, Agent, or Firm* — Wolf, Greenfield & Sacks, P.C.

(57) ABSTRACT

A method for managing a replay protection memory block (RPMB) of a storage device includes allocating an RPMB master region managed separately from an RPMB region in which an RPMB key is stored in the RPMB of the storage device, programming a master key into the RPMB master region responsive to a request from a host, receiving a reset request for the RPMB region using the master key from the host, resetting the RPMB key in response to the reset request for the RPMB region, and receiving a reset lock request for the RPMB region from the host.

20 Claims, 17 Drawing Sheets

1000

(56)           References Cited

U.S. PATENT DOCUMENTS

| | | |
|---|---|---|
| 2022/0164293 A1 | 5/2022 | Pearson et al. |
| 2022/0164487 A1 | 5/2022 | Gyllenskog et al. |

OTHER PUBLICATIONS

JEDEC Standard, "Universal Flash Storage (UFS), Version 3.1", JEDEC Standard No. JESD220E, JEDEC Solid State Technology Association, Jan. 2020, (421 pages).
JEDEC Standard, "Universal Flash Storage, Version 4.0", JEDEC Standard No. JESD220F; Retrieved Nov. 16, 2023, from https://www.jedec.org/standards-documents/docs/jesd220f, Aug. 2022, (2 pages).

\* cited by examiner

FIG. 5

SECURITY PROTOCOL OUT CDB

| Bit Byte | 7 | 6 | 5 | 4 | 3 | 2 | 1 | 0 |
|---|---|---|---|---|---|---|---|---|
| 0 | OPERATION CODE (B5h) | | | | | | | |
| 1 | SECURITY PROTOCOL (ECh) | | | | | | | |
| 2 | SECURITY PROTOCOL SPECIFIC | | | | | | | |
| 3 | | | | | | | | |
| ... | | | | | | | | |
| 32 | RPMB Request for Authentication Key Programming | | | | | | | |
| ... | | | | | | | | |
| 95 | | | | | | | | |

| SECURITY PROTOCOL SPECIFIC | | Description |
| --- | --- | --- |
| CDB Byte 2 | CDB Byte3 | |
| 00h | 01h | RPMB Region_0 |
| 01h | 01h | RPMB Region_1 |
| 02h | 01h | RPMB Region_2 |
| 03h | 01h | RPMB Region_3 |
| 04h | 01h | RPMB Master Region |
| Other values | | Reserved |

| | EHS Header | | 1322 |
|---|---|---|---|
| 0~3 | | | |
| 4~5 | (Req./Resp. Message Type) | 0001h | |
| 6~21 | (Nonce) | 0.. 00h | |
| 22~25 | (Write Counter) | 0.. 00h | |
| 26~27 | (Address/LUN) | 0000h | |
| 28~29 | (Block Count) | 0000h | |
| 30~31 | (Result) | 0000h | |
| 32~63 | (MAC/Key) | Key | 1324 |

| IDN | Name | ATTRIBUTES | | | | |
|-----|------|------------|------|---------------------|-----|-------------|
| | | Access Property | Size | Type #Ind. # Sel. | MDV | Description |
| 34h | bRpmbMasterRegLock | Read/ Write Once | 1 byte | D | 00h | RPMB Master Region Lock 00h : RPMB Master Region not locked 01h : RPMB Master Region locked Others : Reserved |

| | EHS Header | |
|---|---|---|
| 0~3 | | |
| 4~5 | (Req./Resp. Message Type) | 0002h |
| 6~21 | (Nonce) | Nonce from the host |
| 22~25 | (Write Counter) | 0.. 00h |
| 26~27 | (Address/LUN) | 0000h |
| 28~29 | (Block Count) | 0000h |
| 30~31 | (Result) | 0000h |
| 32~63 | (MAC/Key) | 0.000h |

| 0~3 | EHS Header | |
|---|---|---|
| 4~5 | (Req./Resp. Message Type) | 000Ah |
| 6~21 | (Nonce) | Nonce from the host |
| 22~25 | (Write Counter) | Current counter value |
| 26~27 | (Address/LUN) | 0000h |
| 28~29 | (Block Count) | 0000h |
| 30~31 | (Result) | 0000h |
| 32~63 | (MAC/Key) | MAC from the host |

Figure 11:
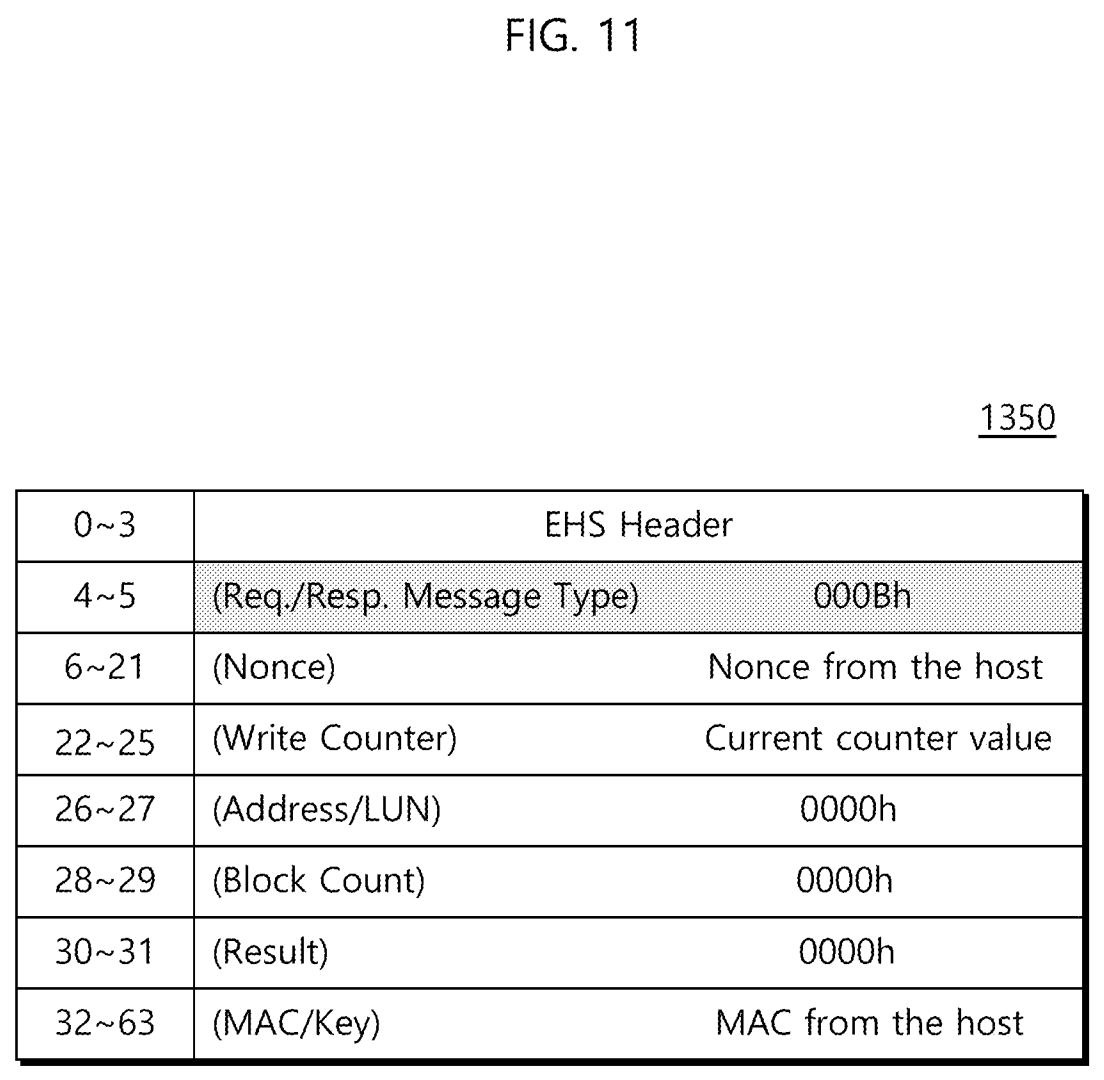

| 0~3 | EHS Header | |
|---|---|---|
| 4~5 | (Req/Resp Message Type) | 000Bh |
| 6~21 | (Nonce) | Nonce from the host |
| 22~25 | (Write Counter) | Current counter value |
| 26~27 | (Address/LUN) | 0000h |
| 28~29 | (Block Count) | 0000h |
| 30~31 | (Result) | 0000h |
| 32~63 | (MAC/Key) | MAC from the host |

| 0~3 | EHS Header | |
|------|-----------|---|
| 4~5 | (Req./Resp. Message Type) | 000Ah |
| 6~21 | (Nonce) | Nonce from the host |
| 22~25 | (Write Counter) | Current counter value |
| 26~27 | (Address/LUN/Init. Level) | 0000h~0002h |
| 28~29 | (Block Count) | 0000h |
| 30~31 | (Result) | 0000h |
| 32~63 | (MAC/Key) | MAC from the host |

STORAGE DEVICE HAVING AN RPMB RESET FUNCTION AND RPMB MANAGEMENT METHOD THEREOF

CROSS-REFERENCE TO RELATED APPLICATIONS

This application claims priority under 35 U.S.C. § 119 to Korean Patent Application No. 10-2022-0087699 filed on Jul. 15, 2022, and No. 10-2022-0129007 filed on Oct. 7, 2022, in the Korean Intellectual Property Office, the disclosures of which are incorporated by reference herein in their entireties.

BACKGROUND

Embodiments of the present disclosure described herein relate to a semiconductor memory device, and more particularly, to a storage device having a replay protected memory block (RPMB) reset function and an RPMB management method thereof.

Recently, various mobile devices or electronic devices, such as smart phones, desktop computers, laptop computers, tablet PCs, and wearable devices are more widely used. These electronic devices usually include a storage device for storing data. In particular, much effort has been made to increase the capacity of the storage device and to improve the speed of the storage device according to the trend of increasing the capacity and speed of such electronic devices.

A storage device using a nonvolatile memory device as a storage medium may store user-sensitive data (e.g., personal information, authentication key, password, etc.). To prevent malicious users from accessing sensitive data, the storage device may support a Replay Protected Memory Block (RPMB). In the replay protected memory block RPMB, a key for secure access to the storage device (hereinafter referred to as an RPMB key) is stored.

However, the RPMB key may be programmed in a One Time Program OTP method by a host (e.g., an application processor) of the storage device. Therefore, access to the storage device may be difficult in a situation where the host needs to be replaced. As long as the RPMB key stored in the storage device exists, the replaced host cannot access the RPMB region of the storage device. Accordingly, a technique for resetting the RPMB region is desired to increase the utilization of the storage device.

SUMMARY

Embodiments of the present disclosure provide a storage device capable of resetting an RPMB region and setting a reset lock, and a method for managing the RPMB.

A method for managing a replay protected memory block RPMB of a storage device, comprising, allocating an RPMB master region, which is managed separately from an RPMB region in which an RPMB key is stored, in the RPMB of the storage device, programming a master key into the RPMB master region responsive to a request from a host, receiving a reset request for the RPMB region using the master key from the host, resetting the RPMB key in response to the reset request for the RPMB region, and receiving a reset lock request for the RPMB region from the host.

A storage device comprising, a non-volatile memory device, and a storage controller configured to access the nonvolatile memory device responsive to a request of a host, wherein the storage controller is configured to divide and manage a replay protected memory block RPMB of the nonvolatile memory device into an RPMB region in which an RPMB key is stored and an RPMB master region in which a master key is stored, and wherein the storage controller is configured to program the master key in the RPMB master region responsive to a request from the host and to reset the RPMB region in response to a reset request from the host for the RPMB region based on the master key.

A management method of a replay protected memory block (RPMB) of a storage device, comprising, allocating an RPMB master region managed separately from an RPMB region in which an RPMB key is stored in the RPMB of the storage device, programming a master key in the RPMB master region responsive to a request of a host, requesting, by the host, to reset the RPMB region of the storage device using the RPMB master key, and setting a reset lock to block resetting of the RPMB region responsive to a request of the host.

BRIEF DESCRIPTION OF THE FIGURES

The above and other objects and features of the present disclosure will become apparent by describing in detail embodiments thereof with reference to the accompanying drawings.

FIG. 5 is a table illustrating an example of a command format (CDB) for programming the master key according to an embodiment of the inventive concept.

FIGS. 6A and 6B are tables illustrating details of RPMB request fields for the security protocol specification and authentication key program of FIG. 5.

FIG. 7 is a table illustrating examples of the attributes of the RPMB master region defined in the storage system according to an embodiment of the inventive concept.

FIGS. 9A and 9B are tables illustrating message fields of each of the write counter request and the RPMB key reset request of the RPMB master region of FIG. 8.

FIG. 10 is a diagram illustrating an operation of FIG. 3 in detail.

FIG. 11 is a table illustrating an example of a message field of a command provided when requesting a reset lock of FIG. 10.

FIG. 12 is a diagram illustrating another embodiment of the RPMB reset operation of FIG. 3.

FIG. 14 is a table illustrating example message fields of commands for requesting a reset of an RPMB region including an initialization level (Init. Level) according to an embodiment of the inventive concept.

3

Figure 15:
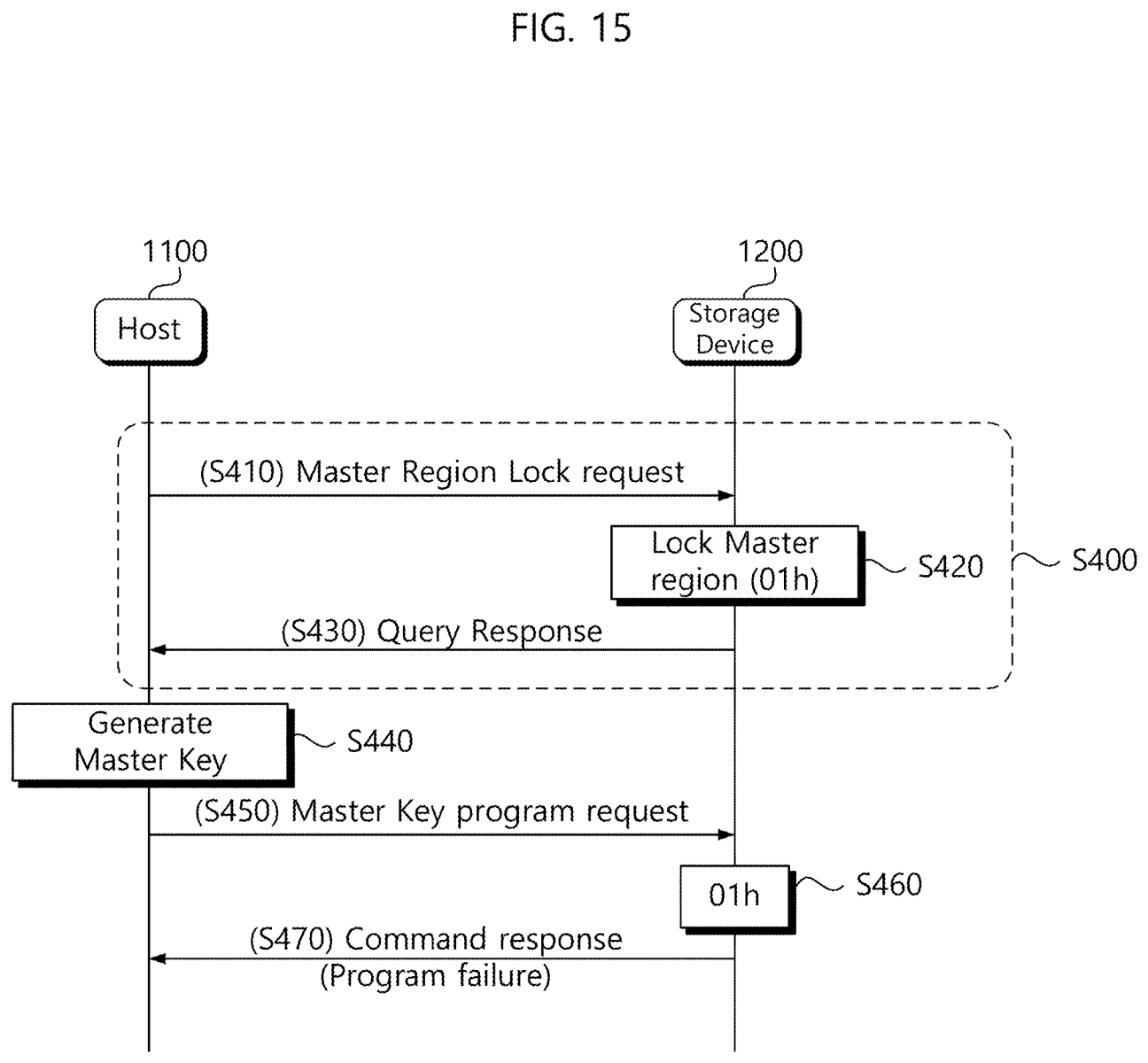
Figure 1:
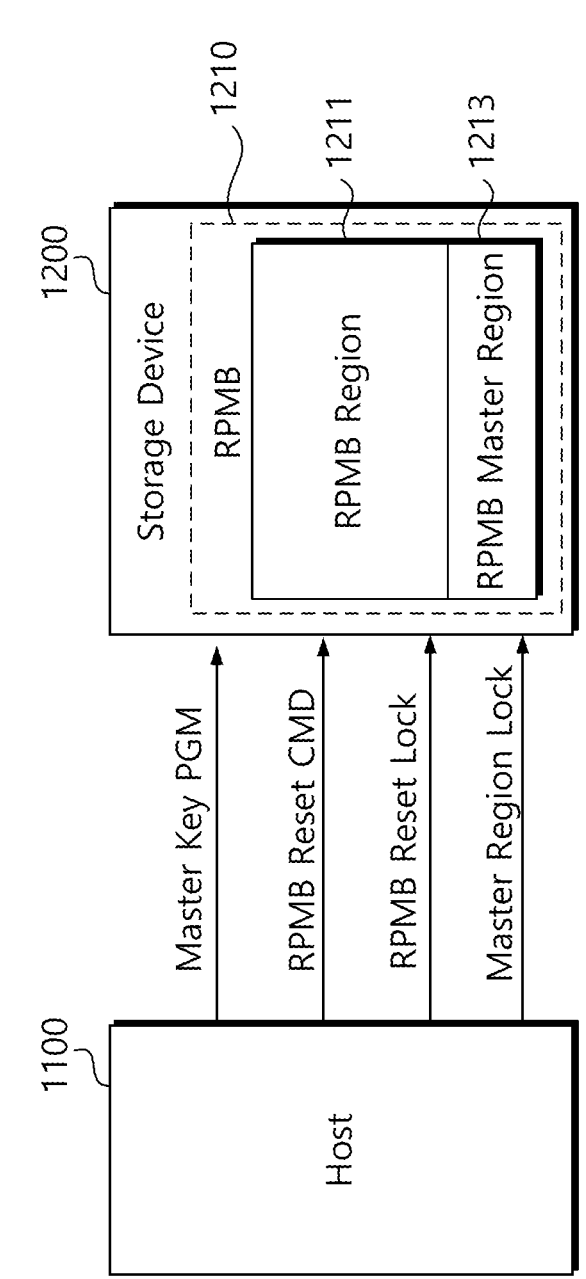
FIG. 1 is a block diagram illustrating a storage system capable of resetting a replay protected memory block (RPMB) according to an embodiment of the inventive concept.

FIG. 15 is a diagram illustrating a method of setting a lock of an RPMB master region according to an embodiment of the inventive concept.

DETAILED DESCRIPTION

Hereinafter, embodiments of the inventive concept will be described in detail with reference to the accompanying drawings. The same reference numerals are used for the same components in the drawings, and redundant descriptions thereof are omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram illustrating a storage system 1000 capable of resetting a replay protected memory block RPMB according to an embodiment of the inventive concept. Referring to FIG. 1, a storage system 1000 may include a host 1100 and a storage device 1200.

The host 1100 may be configured to manage and process all operations of the storage system 1000. The host 1100 may be configured to perform various arithmetic/logical operations. For example, host 1100 may include one or more processor cores. The host 1100 may be implemented using dedicated circuits such as Field Programmable Gate Arrays (FPGAs) or Application Specific Integrated Circuits (ASICs), or may be implemented as a System on Chip (SoC). For example, the host 1100 may include a general-purpose processor, a dedicated processor, or an application processor. The host 1100 may be a processor itself or an electronic device or system including a processor.

The host 1100 may be configured to generate commands and data for access to the storage device 1200. For example, a write command, write data, request may be converted/processed into packets (e.g., CMDw UPIU, DATA UPIU) including a UFS Protocol Information Unit (UPIU) according to the interface protocol proposed by JEDEC. In particular, the host 1100 may be configured to generate an RPMB logic unit write request (RPMB LU Write) when writing data, such as an authentication key to ensure a security function.

The host 1100 according to some embodiments of the inventive concept may be configured to generate an RPMB reset command capable of resetting an RPMB key stored in the RPMB region 1211 of the storage device 1200. Also, the host 1100 may be configured to generate a command for programming a master key. The master key is used as a security key for performing authentication during a reset operation of the RPMB region 1211.

The RPMB reset command can be performed using a master key programmed in the RPMB master region 1213. In addition, the host 1100 may be configured to program a new RPMB key into the RPMB region 1211 after the RPMB region 1211 is reset. Thereafter, the host 1100 may be configured to generate a reset lock command to block the reset of the RPMB region 1211 in which the new RPMB key is programmed. When generating and executing the reset lock command, the host 1100 and the storage device 1200 may proceed with an authentication procedure using a master key.

In addition, to enhance the security of the storage device 1200, the host 1100 may be configured to take measures to block the programming of a new master key into the RPMB master region 1213. For example, the host 1100 may be configured to generate a master region lock command and transmit it to the storage device 1200. In response to a master region lock command, the storage device 1200 may be configured to perform a setting of an attribute to block a write operation of the RPMB master region 1213. After that, the storage device 1200 be configured to reject a new master key program request to the RPMB master region 1213.

The storage device 1200 may include a storage controller and a nonvolatile memory device. A replay protected memory block (RPMB, 1210) may be included in the data area of the nonvolatile memory device. The replay protected memory block 1210 includes an RPMB region 1211 and an RPMB master region 1213. Here, the RPMB region 1211 and the RPMB master region 1213 may be memory areas allocated by logical addresses. That is, the RPMB region 1211 and the RPMB master region 1213 may be allocated as areas that are logically divided rather than divided into physical areas in the storage medium.

The RPMB region 1211 may be configured to store an RPMB key, a write counter, and RPMB data. In particular, a master key for authenticating access to the RPMB region 1211 may be stored in the RPMB master region 1213. In addition, the storage device 1200 may be configured to block resetting of the RPMB region 1211 in response to a request for an RPMB reset lock. In addition, the storage device 1200 may be configured to block master key programming to the RPMB master region 1213 responsive to the master region lock command.

The storage device 1200 according to embodiments of the inventive concept may be configured to reset the RPMB region 1211 or program a new RPMB key responsive to a request or command of the host 1100. In addition, the storage device 1200 may be configured to program the master key in the RPMB master region 1213 responsive to a master key programming command from the host 1100. The RPMB region 1211 and the RPMB master region 1213 of the storage device 1200 may be protected through the reset lock command or the master region lock command from the host 1100.

According to the configuration described above, the storage device 1200 according to embodiments of the inventive concept can be configured to program the master key in the RPMB master region 1213 through a master key program command (Master Key PGM) or request of the host 1100. Also, the host 1100 may be configured to reset the RPMB key of the storage device 1200 using the master key. As a result, even if the RPMB key is generated using the OTP method, the RPMB region 1211 can be reset and the storage device 1200 can be reworked.

Figure 2:
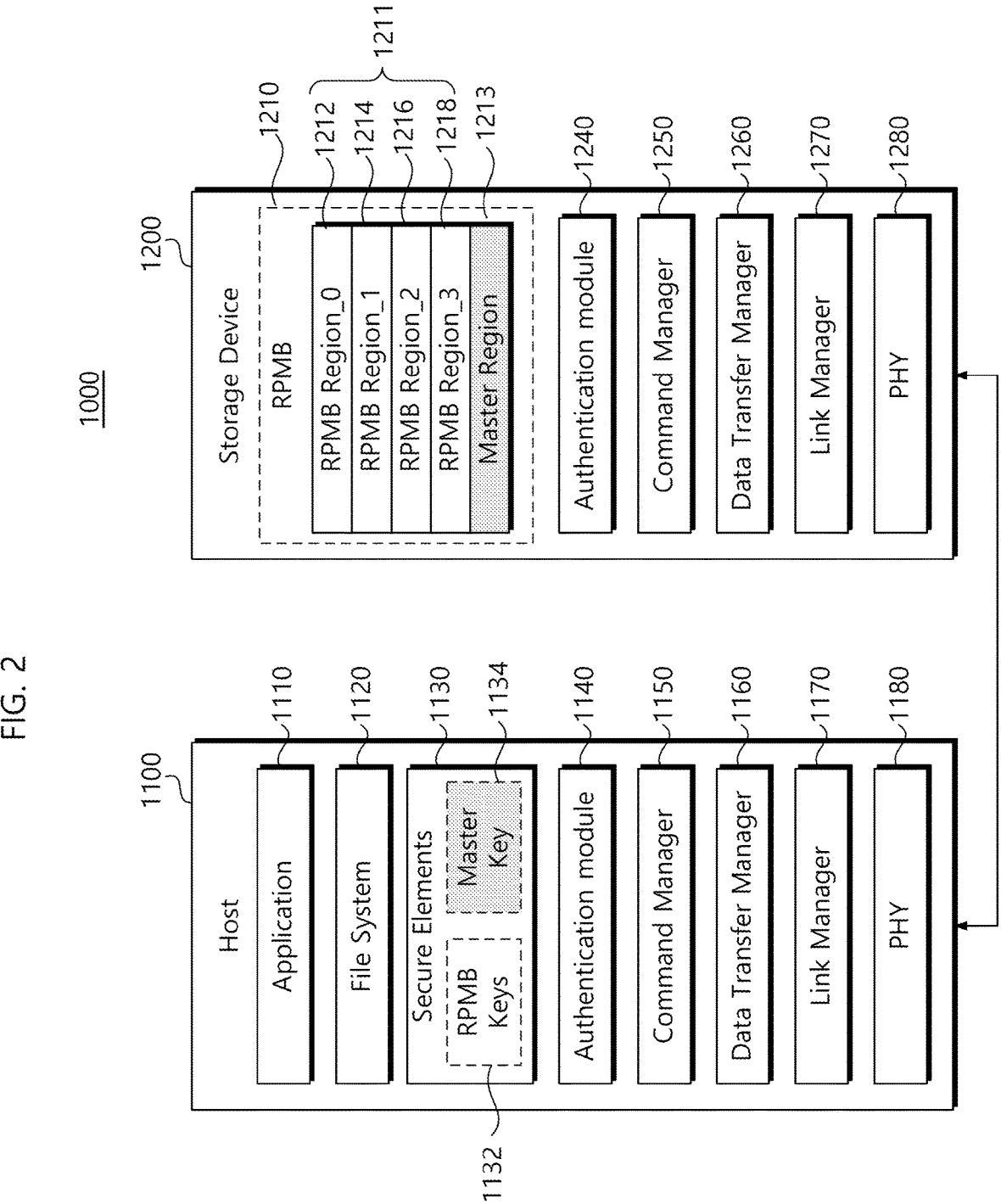
FIG. 2 is a block diagram illustrating a hierarchical structure of the storage system of FIG. 1 in more detail.

FIG. 2 is a block diagram illustrating a hierarchical structure of the storage system of FIG. 1 in more detail. Referring to FIG. 2, a storage system 1000 may include a host 1100 and a storage device 1200.

Host 1100 includes application 1110, file system 1120, secure element 1130, authentication module 1140, command manager 1150, data transfer manager 1160, link manager 1170, and physical layer 1180.

The application 1110 may include various application programs, processes, and the like that are run on the host 1100. File system 1120 may be configured to organize and manage various data generated by application 1110. The secure element 1130 may be configured to process and/or store secure data, such as cryptographic keys, sensitive data, and sensitive codes. For example, the secure element 1130 be configured to protect the storage system 1000 from tampering attacks, such as replay attack, microprobing, software attack, eavesdropping, and fault injection. Although not shown in detail, the secure element 1130 may include a secure processor and secure memory.

In particular, the secure element 1130, according to embodiments of the inventive concept, may provide RPMB keys 1132 programmed in the RPMB regions 1211 of the storage device 1200 and a master key 1134 programmed in the RPMB master region 1213. For example, the RPMB keys 1132 includes key values to be written in each of the RPMB regions (Region_0 to Region_3). The master key 1134 is programmed into the RPMB master region 1213 of the storage device 1200. The master key 1134 may be used during authentication for resetting at least one of the RPMB regions (Region_0 to Region_3).

The authentication module 1140 may be configured to generate a Message Authentication Code (MAC) by combining the RPMB keys 1132 or master key 1134 value provided by the security element 1130 and the contents of the RPMB message frame. For example, the authentication module 1140 may be configured to generate a message authentication code MAC by combining the master key 1134 and the write counter value when requesting an RPMB reset. Further, the authentication module 1240 of the storage device 1200 be configured to generate a message authentication code MAC' using the master key stored in the RPMB master region 1213 and the write counter. The authentication module 1240 may perform authentication by comparing a message authentication code MAC provided by the host 1100 and a message authentication code MAC' generated by the storage device 1200.

The command manager 1150 may be configured to support various command sets supported between the host 1100 and the storage device 1200. In an example embodiment, the command manager 1150 may include a UFS Native command set and a UFS SCSI command set. A UFS command set provided in the command manager 1150 may configure a command to be transmitted to the storage device 1200 responsive to a request from the application 1110 or the file system 1120.

The data transfer manager 1160 may be configured to provide services for higher layers. The data transfer manager 1160 may be configured to generate a command, data, or query request provided from the application 1110 or the command manager 1150 in a packet in the form of a UPIU (UFS Protocol Information Unit).

The link manager 1170 be configured to manage a connection with the storage device 1200. Also, the physical layer 1180 may be configured to manage physical communication with the storage device 1200. For example, the physical layer 1180 may include hardware components, such as MIPI Unipro and MIPI M-PHY, that are physically connected to the UFS Interconnect Layer (UIC) of the storage device 1200.

The storage device 1200 may include an RPMB 1210, an authentication module 1240, a command manager 1250, a data transfer manager 1260, a link manager 1270, and a physical layer 1280.

The RPMB 1210 includes a plurality of RPMB regions 1212, 1214, 1216, and 1218 and a master region 1213. RPMB keys generated by the host 1100 are stored in the plurality of RPMB regions 1212, 1214, 1216, and 1218. In addition, write counters and RPMB data corresponding to the stored RPMB key values are stored in the plurality of RPMB regions 1212, 1214, 1216, and 1218. The write counter will be incremented by 1 each time the RPMB key is successfully written. Since the Write Counter never decrements, Replayed Write Access is blocked. Also, write access to an area in which the write counter reaches the maximum value among the plurality of RPMB regions 1212, 1214, 1216, and 1218 is blocked. Afterwards, the RPMB region where the write counter reaches the maximum value will become a read-only area. In this case, if the RPMB key is lost or the host 1100 is changed, management of the storage device 1200 becomes impossible. According to embodiments of the inventive concept, by providing a reset means for the RPMB region 1211, it may be possible to program a new RPMB key even if the RPMB key does not exist.

The master key for processing a reset request or a reset lock request for the plurality of RPMB regions 1211, 1212, 1213, and 1214 may be stored in the master region 1213. In addition, a write counter for a master key may be stored in the master region 1213.

Configurations or functions of the authentication module 1240, the command manager 1250, the data transfer manager 1260, the link manager 1270, and the physical layer 1280

Configurations or functions of the authentication module 1240, the command manager 1250, the data transfer manager 1260, the link manager 1270, and the physical layer 1280 are based on the authentication module 1140, the command manager 1150, data transfer manager 1160, link manager 1170, and physical layer 1180 of the host 1100, respectively. Because it can be understood as a configuration in which corresponding layers logically communicate with each other, a detailed description thereof will be omitted.

Due to the hierarchical structure of the storage system 1000 described above, the host 1100 may be configured to program a master key capable of resetting the RPMB region 1211 and/or to set a reset lock to the storage device 1120. The host 1100 may be configured to reset the RPMB region 1211 of the storage device 1200 or may be configured to set a reset lock by using the master key. In addition, the host 1100 may be configured to lock the RPMB master region 1213 to block the master key program of the storage device 1200. A locking action on the RPMB master region 1213 by the host 1100 may be implemented through a query request. The above-described hierarchical structures and functions of each of the host 1100 and the storage device 1200 are examples and the scope of the present inventive concept is not limited thereto.

Figure 3:
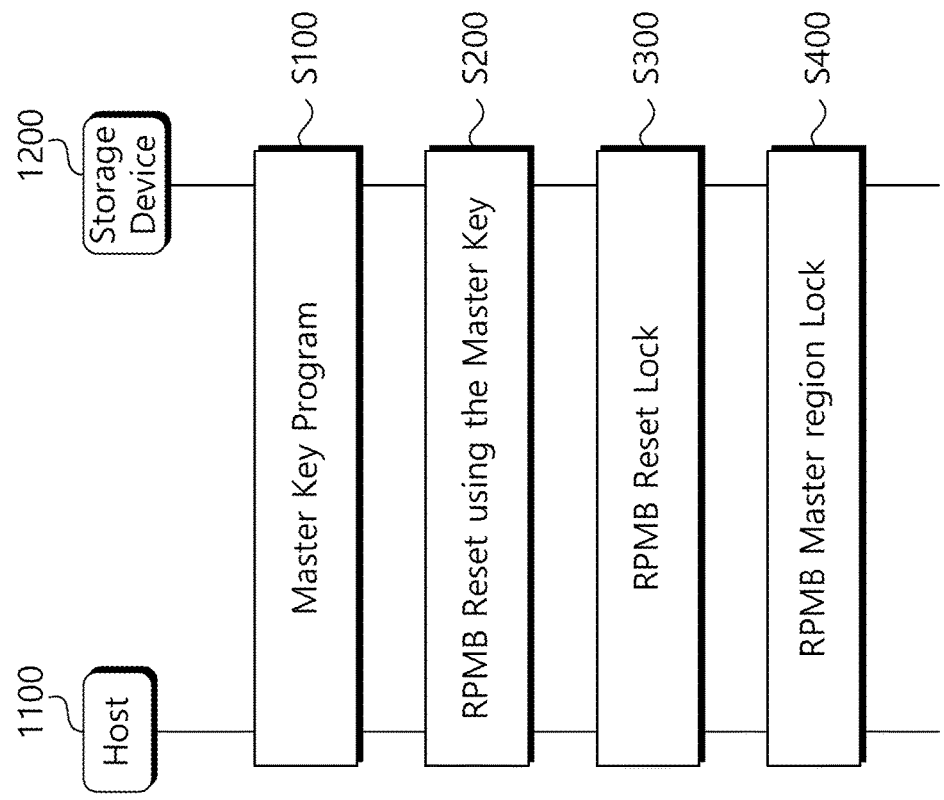
FIG. 3 is a diagram illustrating a method of resetting and setting a reset lock in an RPMB region of a storage system according to an embodiment of the inventive concept.

FIG. 3 is a diagram illustrating a method of resetting and configuring a reset lock in an RPMB region of a storage system according to an embodiment of the inventive concept. Referring to FIG. 3, the host 1100 may program a master key for managing the RPMB region 1211 of the storage device 1200 in a separately allocated RPMB master region 1213. The host 1100 can reset the RPMB region 1211 by using the programmed master key, and can program a new RPMB key. In addition, the host 1100 may block an additional reset request for the RPMB region 1211 by using a master key programmed in the RPMB master region 1213. Finally, to enhance security, the storage system 1000 may set a lock to block programs on the RPMB master region 1213.

In block S100, the host 1100 programs the master key in the RPMB master region 1213 of the storage device 1200. The RPMB 1210 of the storage device 1200 may be partitioned into an RPMB region 1211 in which the RPMB key is stored and an RPMB master region 1213 in which the master key is stored. The RPMB key stored in the RPMB region 1211 may be a key value generated by an OTP method by another host. Accordingly, access to the RPMB region 1211 by the current host 1100 may not be possible in a current state. However, the host 1100 may program the master key for resetting the RPMB region 1211 in the RPMB master region 1213. Once the master key is programmed into the RPMB master region 1213, the host 1100 can reset the RPMB region 1211.

In block S200, the host 1100 may delete or reset the RPMB key programmed in the RPMB region 1211 using the master key. The host 1100 may read the write counter corresponding to the master key of the RPMB master region 1213. Also, the host 1100 may issue a command requesting reset of the RPMB region 1211 using the master key and the read write counter. When the RPMB key of the RPMB region 1211 is reset, access to the RPMB region 1211 by the host 1100 becomes possible thereafter. In addition, the host 1100 may program a new RPMB key into the RPMB region 1211.

In block S300, the host 1100 may issue a reset lock request for blocking reset of the RPMB key using the master key. Then, the storage device 1200 may block the reset of the RPMB region 1211 in response to the reset lock request of the host 1100. Once the reset lock is set, the storage device 1200 may reject a request for resetting the RPMB key programmed in the RPMB region 1211 using the master key.

In block S400, the host 1100 may set a lock on the master key stored in the RPMB master region 1213. If the RPMB master region 1213 is set to lock, future programming of a new master key is blocked. Locking the RPMB master region 1213 may be a measure for providing security in a state in which the master key is not programmed. For example, the storage device 1200 may be shipped in a state in which the master key is not programmed by the host 1100. At this time, it may be necessary to block master key programming of the RPMB master region 1213 by an unauthorized user. To this end, the RPMB master region 1213 may be locked immediately before shipment.

The reset or program of the RPMB key of the storage system 1000 described above may enable the storage device 1200 to be reworked even after the host 1100 is changed. To this end, the RPMB 1210 of the storage device 1200 may have a separate RPMB master region 1213 in which master key is programmed.

Figure 4:
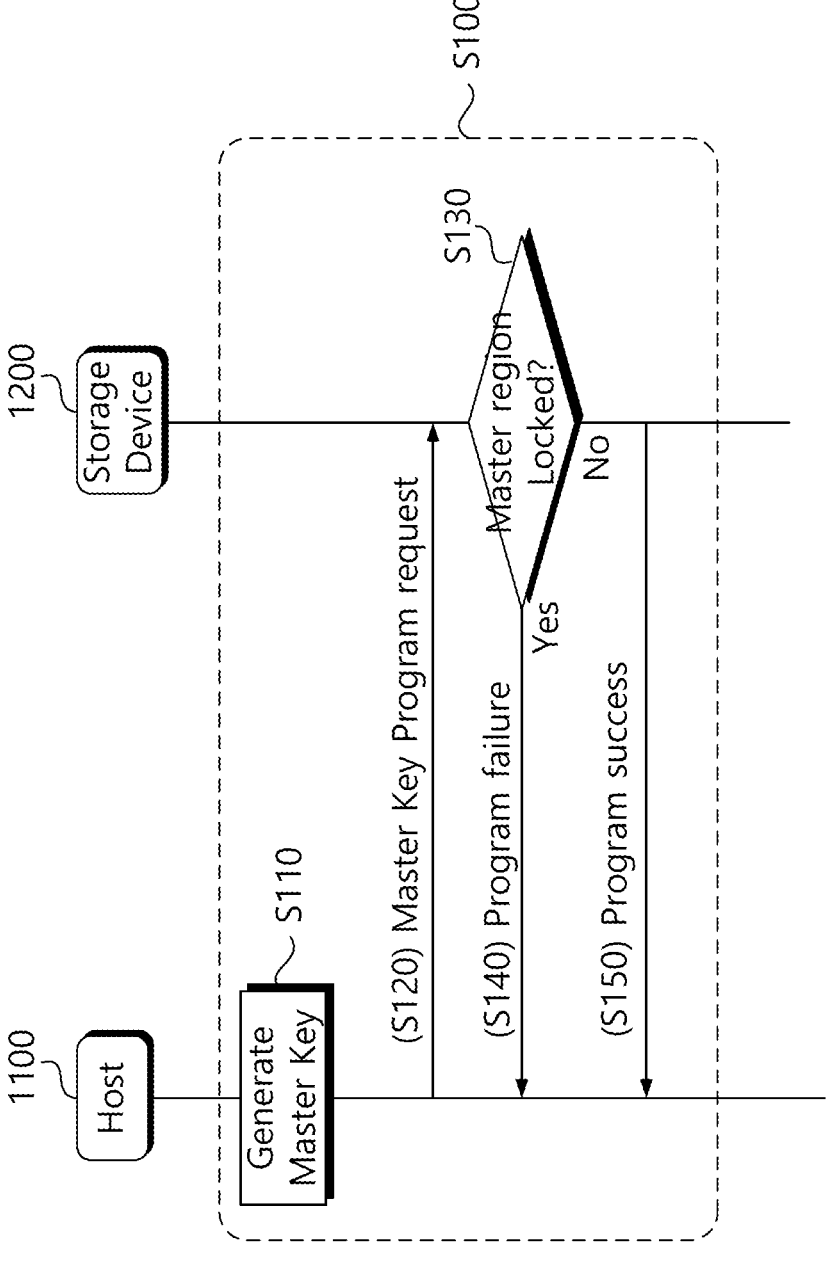
FIG. 4 is a diagram illustrating an operation of FIG. 3 in detail.

FIG. 4 is a diagram illustrating block S100 of FIG. 3 in detail. Referring to FIG. 4, the host 1100 may generate a master key for resetting at least one RPMB key in the RPMB region 1211 and program it in the RPMB master region 1213.

In block S110, the host 1100 generates the master key to be used as an authentication key for accessing the RPMB region 1211. The master key may be generated in secure element 1130 of host 1100.

In block S120, the host 1100 transmits a command to the storage device 1200 to program the generated master key into the RPMB master region 1213. At this time, a program request message for the master key may be transmitted using the 'SECURITY PROTOCOL OUT' command of the UFS protocol. Master key programming is performed through an Authentication Key Programming Request to the RPMB (1210). At this time, a code value indicating that the program is directed to the RPMB master region 1213 (for example, '04h') may be newly defined in the 'SECURITY PROTOCOL SPECIFIC' field of the command.

In block S130, the storage device 1200 checks whether the RPMB master region 1213 is locked in response to the master key program request. The locked state of the RPMB master region 1213 may be provided as an Attribute item in the newly defined UFS specification. If the RPMB master region 1213 is in a locked state ('Yes' direction), the procedure proceeds to block S140. On the other hand, if the RPMB master region 1213 is in a not locked state ('No' direction), the procedure proceeds to block S150.

In block S140, the storage device 1200 provides a program failure message to the host 1100 as a command response. This means that the RPMB master region 1213 has already been programmed with the master key one or more times or is set to a locked state.

In block S150, the storage device 1200 provides a master key program success message to the host 1100 as a command response. This means that the host 1100 can reset the RPMB key existing in the RPMB region 1211 using the newly programmed master key.

In the above, the master key programming procedure of the RPMB master region 1213 according to an embodiment of the present inventive concept has been described. The master key programmed in the RPMB master region 1213 may be used as the authentication key for resetting or programming the RPMB region 1211 thereafter. In addition, the master key can be used for various RPMB setting or programming operations other than resetting or programming the RPMB region 1211.

FIG. 5 is a table illustrating an example a command format CDB for programming the master key according to some embodiments of the inventive concept. Referring to FIG. 5, the master key program command related to the replay protected memory blocky RPMB may be transferred from the host 1100 to the storage device 1200 according to a SECURITY PROTOCOL OUT command format.

The first byte (Byte 0) of the command format is an operation code indicating security protocol output (SECURITY PROTOCOL OUT) or security protocol input (SECURITY PROTOCOL IN). Because the command for programming the master key according to embodiments of the inventive concept is a security protocol output (SECURITY PROTOCOL OUT), the operation code may be set to 'B5h'. The second byte (Byte 1) of the command format can be set to 'ECh' representing the UFS security protocol of the JEDEC standard.

The security protocol specification field (SECURITY PROTOCOL SPECIFIC, 1310) for the master key program according to embodiments of the inventive concept is defined in the third and fourth bytes (Byte 2, Byte 3) of the command format. The RPMB master region 1213 where the master key is to be programmed is defined through the security protocol specification 1310 field. A detailed configuration of the security protocol specification 1310 field will be described in detail in FIG. 6A to be described later.

The value of the master key to be programmed may be included in the RPMB message field 1320 defined in the byte range (Byte 32 to Byte 95) of the command format. The RPMB message field 1320 corresponds to a field defined as an RPMB Request for Authentication Key program for an authentication key program. A message type and a master key to be programmed may be included in the RPMB message field 1320.

According to the command format for programming the master key described above, an RPMB master region 1213 may be designated in addition to the RPMB region 1211. Through the allocation of the RPMB master region 1213, the storage system 1000 can reset the RPMB key even if the host 1100 is changed.

FIG. 6A and FIG. 6B are tables illustrating details of RPMB request fields for the security protocol specification and authentication key program of FIG. 5. Referring to FIG. 6A, the security protocol specification 1310 field for the programming of the master key according to embodiments of the inventive concept includes a command descriptor block (hereinafter, CDB) designating the RPMB region 1211 and the RPMB master region 1213. Codes '00h', '01h', '02h', and '03h' indicating each of the four RPMB regions (RPMB Region_0 to RPMB Region_3) are defined in 'CDB Byte 2'. In addition, the code '04h' indicating the RPMB master region 1213 may be newly set in 'CDB Byte 2'. When the master key is programmed, the code '04h' indicating the RPMB master region 1213 may be set in the SECURITY PROTOCOL OUT command format.

Referring to FIG. 6B, an RPMB message field 1320 for an authentication key program is shown as an example. The RPMB message field 1320 includes an additional header (EHS Header) including information for management of the storage device 1200, a request/response message type 1322, a nonce, a write counter, an address, a block count, a result, and message authentication code (MAC)/key 1324.

For the master key program according to embodiments of the inventive concept, a code value '0001h' indicating an authentication key program request may be set in the request/response message type 1322. In addition, the master key generated by the host 1100 may be included in the message authentication code (MAC)/key 1324 part.

FIG. 7 is a table illustrating example attributes of the RPMB master region defined in the storage system according to embodiments of the inventive concept. Referring to FIG. 7, an attribute 1330 of the RPMB master region may, as an example, be named 'bRpmbMasterRegLock' in the UFS standard of JEDEC.

The attribute 1330 of the RPMB master region may have a 'one-time read/write' characteristic as an access property. 'bRpmbMasterRegLock' cannot be reset or reprogrammed any more after being written once. In addition, the attribute 1330 of the RPMB master region is allocated in a 1-byte size and is defined as a device level 'D' attribute type. The default value (MDV) of 'bRpmbMasterRegLock' may be '00h'. To lock the RPMB master region 1213, 'bRpmbMasterRegLock' may be set to '01h'. After 'bRpmbMasterRegLock' is set to '01h', the authentication key program request to the RPMB master region 1213 may be rejected.

Figure 8:
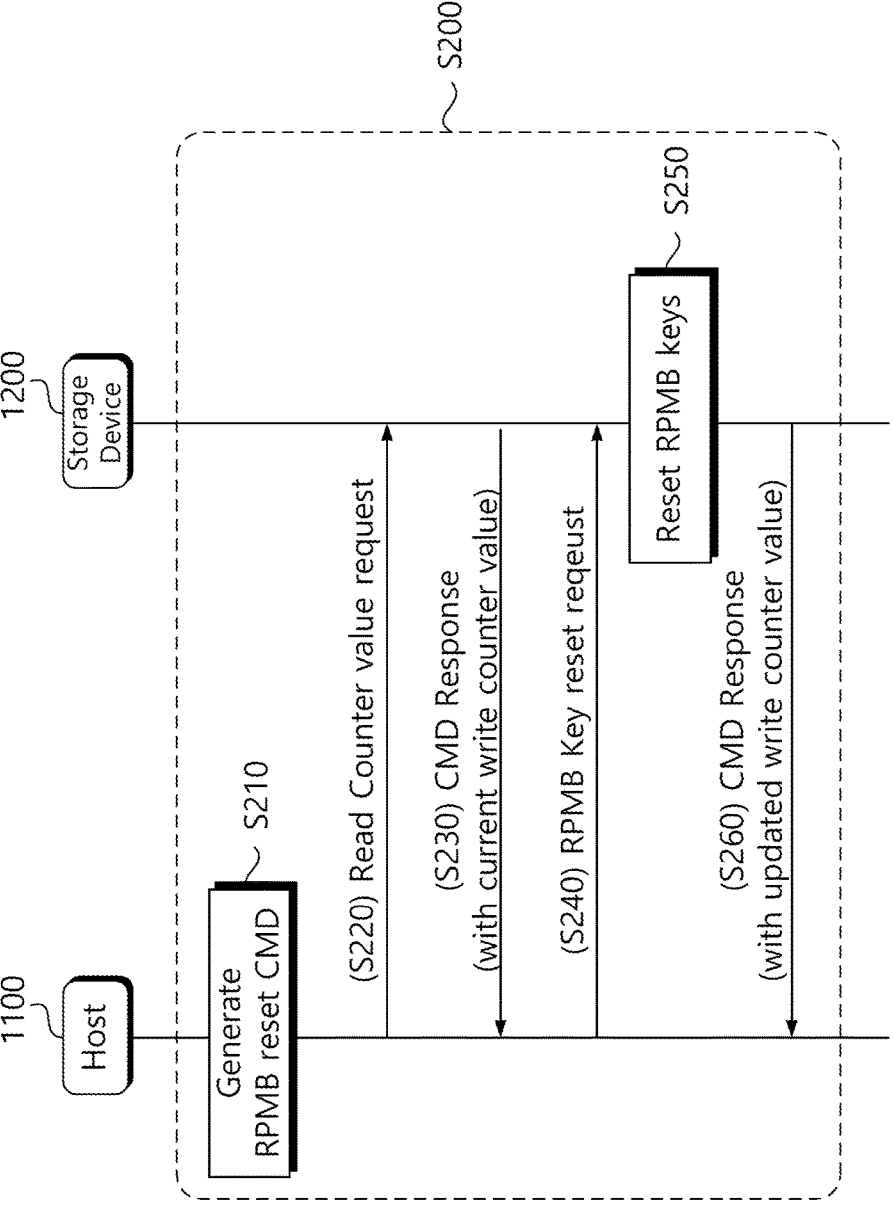
FIG. 8 is a diagram illustrating an operation of FIG. 3 in detail.

FIG. 8 is a diagram illustrating block S200 of FIG. 3 in detail. Referring to FIG. 8, the host 1100 may reset the RPMB region 1211 using a master key already programmed in the RPMB master region 1213. Resetting the RPMB region 1211 means that at least one of the RPMB key, write counter, and RPMB data can be deleted.

In block S210, the host 1100 generates a command requesting reset of the RPMB key stored in the RPMB region 1211.

In block S220, the host 1100 requests the write counter value of the RPMB master region 1213. The host 1100 may request the write counter value of the RPMB master region 1213 using the 'SECURITY PROTOCOL IN' command of the UFS protocol. At this time, the 'SECURITY PROTO-COL SPECIFIC' field of the command may include a code value indicating access to the RPMB master region 1213 (e.g., '04h').

In block S230, the storage device 1200 transmits the write counter value of the current RPMB master region 1213 to the host 1100 as a command response (CMD Response) in response to the request for the write counter value of the RPMB master region 1213.

In block S240, the host 1100 transmits the RPMB key reset request by including the write counter value transmitted from the storage device 1200 in the RPMB message data frame. At this time, the authentication module 1140 of the host 1100 may generate a message authentication code MAC using the contents of the RPMB message data frame (e.g., write counter) and the master key.

In block S250, the storage device 1200 generates a message authentication code MAC' using the contents of the received RPMB message data frame and the master key of the RPMB master region 1213. Also, the storage device 1200 compares the message authentication code MAC' generated by the storage device 1200 and the message authentication code MAC transmitted by the host 1100. If the two message authentication codes MAC, MAC' match, the storage device 1200 deletes the RPMB keys in the RPMB region 1211. On the other hand, if the two message authentication codes MAC, MAC' do not match, the storage device 1200 may transmit a reset failure response to the host 1100.

In block S260, the storage device 1200 transmits a command response to the host 1100. At this time, a write counter for the master key of the RPMB master region 1213 is increased, and the increased write counter value is transmitted to the host 1100.

In the above, the reset procedure of the RPMB key using the master key according to an embodiment of the inventive concept has been briefly described. Although an embodiment of the present inventive concept has been described as deleting the RPMB key in the RPMB region 1211 using the master key, embodiments of the present inventive concept are not limited to the disclosure herein. It will be well understood that deletion or reset of a write counter or RPMB data may be executed according to a reset request of the RPMB region 1211.

FIG. 9A and FIG. 9B are tables illustrating message fields of each of the write counter request and the RPMB key reset request of the RPMB master region of FIG. 8. Referring to FIG. 9A, the write counter read request transmitted from the host 1100 to the storage device 1200 in block S220 is a request for the write counter value of the RPMB master region 1213. At this time, '0002h' may be written in the message field 1330 of the command when a read request is made for the write counter of the RPMB master region 1213. This indicates that the request message type corresponds to a 'write counter read request'.

Referring to FIG. 9B, contents of the RPMB key reset request message transmitted to the storage device 1200 in block S240 of FIG. 8 are briefly illustrated. A newly defined request message type of '000Ah' may be written in the message field 1340 of the reset request command for the RPMB key. A request message type '000Ah' corresponds to a message to delete the RPMB key programmed in the RPMB region 1211.

According to the description of FIGS. 9A and 9B, the request for resetting the RPMB key stored in the RPMB region 1211 can be generated and transmitted in the form of a SECURITY PROTOCOL OUT command used in the UFS standard.

Figure 10:
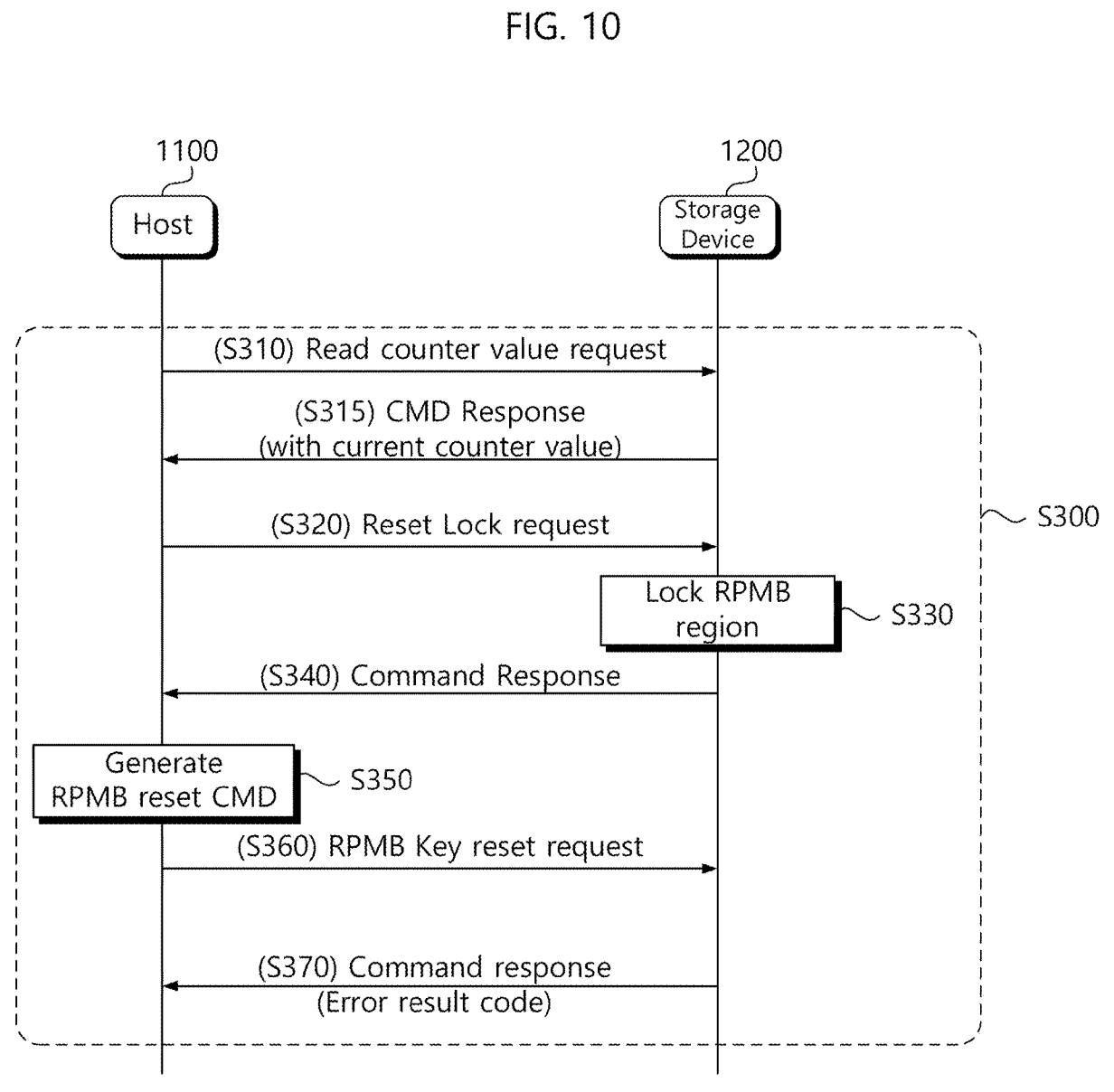

FIG. 10 is a diagram illustrating block S300 of FIG. 3 in detail. Referring to FIG. 10, the host 1100 may configure a reset lock for the RPMB key in the RPMB region 1211 using the master key programmed in the RPMB master region 1213.

In block S310, the host 1100 requests the write counter value of the RPMB master region 1213. The host 1100 may request the write counter value of the RPMB master region 1213 using the 'SECURITY PROTOCOL IN' command of the UFS protocol. At this time, the 'SECURITY PROTO-COL SPECIFIC' field of the command may include a code value indicating access to the RPMB master region 1213 (e.g., '04h').

In block S315, the storage device 1200 transmits a command response to the host 1100 in response to the write counter value request of the RPMB master region 1213. The command response includes the write counter value of the current RPMB master region 1213.

In block S320, the host 1100 transmits a command to request the reset lock of the RPMB key to the storage device 1200. The host 1100 may request the reset lock of the RPMB key by using the 'SECURITY PROTOCOL OUT' command of the UFS protocol.

In block S330, the storage device 1200 sets the reset lock for the RPMB region 1211 in response to the reset lock request for the RPMB region 1211. That is, the locked RPMB region 1211 cannot be deleted or reset at the request of the host any longer. The reset lock of the RPMB region 1211 can be implemented through a register setting that defines the properties of the RPMB region 1211.

In block S340, the storage device 1200 transmits the command response indicating success of reset lock setting of the RPMB region 1211 to the host 1100. The reset lock method of the RPMB region 1211 according to the embodiment of the present inventive concept has been described through blocks S310 and S340. Blocks S350 to S370 illustrate the response of the storage device 1200 to the reset request after the reset lock of the RPMB region 1211 as an example.

In block S350, the host 1100 generates a command requesting reset of the RPMB key in the RPMB region 1211.

In block S360, the host 1100 transmits the RPMB key reset request by including the write counter value transmitted from the storage device 1200 in the RPMB message data frame. At this time, the authentication module 1140 of the host 1100 may generate a message authentication code MAC using the contents of the RPMB message data frame (e.g., write counter) and the master key.

In block S370, the storage device 1200 checks the reset lock setting. If the reset lock is set, the storage device 1200 transmits a reset failure or error result code to the host 1100 as a command response.

In the above, the reset lock method of the RPMB key using the master key according to an embodiment of the present inventive concept has been briefly described. Setting the reset lock of the RPMB key blocks resetting of the additional RPMB region 1211 to enhance the security performance of the storage device 1200.

FIG. 11 is a table illustrating an example of a message field of a command provided when requesting a reset lock of FIG. 10. Referring to FIG. 11, the reset lock request of the RPMB region 1211 may be set to '000Bh' as a request message type defined in bytes 4 and 5. The message type '000Bh' of the message field 1350 of the command for requesting the reset lock indicates that further reset requests for the RPMB key in the RPMB region 1211 should be rejected. Accordingly, the storage device 1200 responds with a reset failure message to the RPMB reset request to the storage device 1200 set to reset lock.

Figure 12:
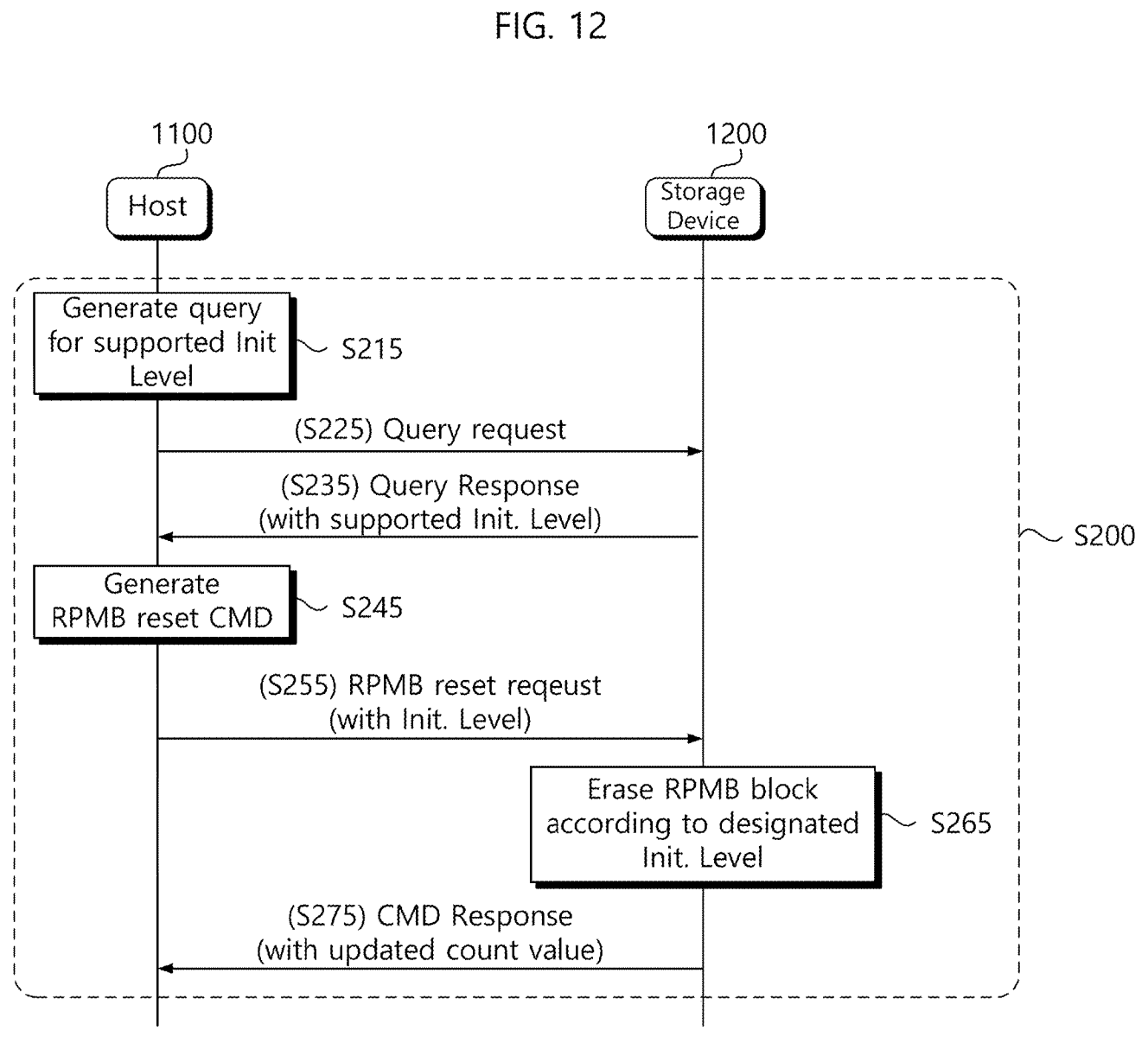

FIG. 12 is a diagram illustrating another embodiment of the RPMB reset block S200 of FIG. 3. Referring to FIG. 12, the host 1100 may use a master key programmed in the RPMB master region 1213 to select a reset range of the RPMB region 1211 according to an initialization level (Init. Level).

For example, the initialization level (Init. Level) of the RPMB region 1211 supported by the storage device 1200 includes a first initialization level (LEVEL 0), a second initialization level (LEVEL 1), and a third initialization level (assume that there are three levels consisting of LEVEL 0, LEVEL 1, and LEVEL 2). The number of initialization levels, however, may vary in accordance with different embodiments of the inventive concept. When the first initialization level LEVEL 0 is selected, the storage device 1200 may reset or initialize only the RPMB key. When the second initialization level LEVEL 1 is selected, the storage device 1200 may initialize the RPMB key and the write counter value. Also, when the third initialization level LEVEL 2 is selected, the storage device 1200 may initialize the RPMB key, write counter, and even the RPMB data. The number of the initialization level and reset range of the above-described initialization levels are only examples for illustrating embodiments of the inventive concept, and the present inventive concept is not limited to the disclosure herein.

In block S215, the host 1100 generates a request for inquiring an initialization level (Init. Level) of the RPMB region 1211 that the storage device 1200 can support. The number of the initialization level or range of initialization levels supported by the storage device 1200 may vary depending on the device.

In block S225, the host 1100 transmits a query requesting an initialization level (Init. Level) supported by the storage device 1200.

In block S235, the storage device 1200 transmits a query response to the host's request. In this case, the query response may include a range of initialization levels supported by the storage device 1200. For example, some storage devices have an initialization level (LEVEL 0) that can reset only the RPMB key, while others have an initialization level (LEVEL 2) that can reset the RPMB key, write counter, and even the RPMB data.

In block S245, the host 1100 selects an initialization level according to the usage scenario of the storage device 1200 and generates an RPMB reset command corresponding to the determined initialization level.

In block S255, the host 1100 transmits the RPMB key reset request by including the write counter value provided from the storage device 1200 and the determined initialization level (Init. Level) in the RPMB message data frame. The authentication module 1140 of the host 1100 may generate a message authentication code MAC using the contents of the RPMB message data frame (e.g., write counter) and the master key.

In block S265, the storage device 1200 performs a specified RPMB reset operation in response to the RPMB reset request including the initialization level (Init. Level). If the initialization level (Init. Level) transmitted from the host 1100 is the first initialization level (LEVEL 0), the storage device 1200 may initialize only the RPMB key. If the initialization level (Init. Level) transmitted from the host 1100 is the second initialization level (LEVEL 1), the storage device 1200 may initialize the RPMB key and the write counter value. In addition, when the initialization level (Init. Level) transmitted from the host 1100 is the third initialization level (LEVEL 2), the storage device 1200 may initialize the RPMB key, the write counter, and even the RPMB data.

In block S275, the storage device 1200 transfers a command response to the host 1100. At this time, the write counter for the master key of the RPMB master region 1213 is increased, and the increased write counter value is transmitted to the host 1100 as a command response.

In the above, the reset procedure of the RPMB key using the master key according to another embodiment of the present inventive concept has been briefly described. Data stored in the RPMB region 1211 can be reset in units of levels by using the master key. In addition, it will be well understood that various embodiments of the inventive concept can be implemented by resetting only some of the plurality of RPMB regions (RPMB Region_0, RPMB Region_1, RPMB Region_2, and RPMB Region_3) using the master key.

Figure 13:
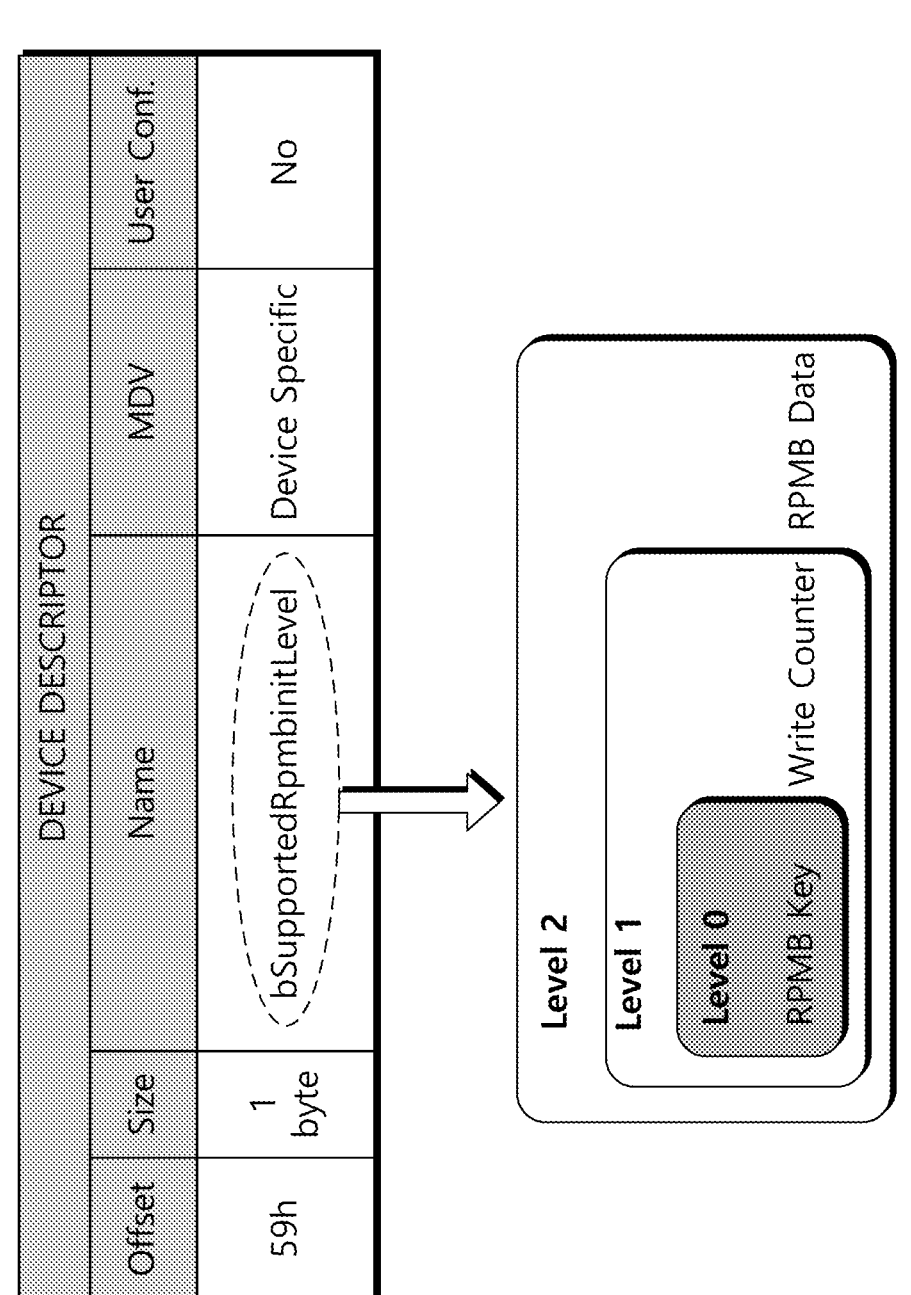
FIG. 13 is a diagram illustrating an initialization level (Init. Level) of a storage device included in the storage system according to an embodiment of the inventive concept.

FIG. 13 is a diagram illustrating an initialization level (Init. Level) of a storage device defined in the storage system according to embodiments of the present inventive concept. Referring to FIG. 13, an initialization level (Init. Level) may be illustratively defined in a device descriptor (DEVICE DESCRIPTOR) of the UFS standard of JEDEC.

An initialization level (Init. Level) of the RPMB region that can be supported by the storage device 1200 may be, for example, named 'bSupportedRpmbinitLevel'. And, as described above, when the initialization level (Init. Level) is divided into three levels, the initialization level (Init. Level) of the storage device 1200 is provided as a manufacturer default value MDV. For example, in the case of the storage device 1200 having an initialization level (Init. Level) of the first initialization level (LEVEL 0), only the RPMB key may be reset with respect to the RPMB reset command. In the case of the storage device 1200 whose initialization level (Init. Level) corresponds to the third initialization level (LEVEL 2), the RPMB key, write counter, and even the RPMB data may be reset using the RPMB reset command.

FIG. 14 is a table illustrating example message fields of commands for requesting a reset of an RPMB region including an initialization level (Init. Level) according to some embodiments of the inventive concept. Referring to FIG. 14, a value of '000Ah' is set as a message type 1372 in the 4th to 5th bytes of the message field 1370. In bytes 26 to 27 of the message field 1370, any one value of '0000h' to '0002h' may be set as the selected initialization level 1374.

A value of '000Ah' may be defined as a message type 1372 indicating an RPMB reset request in the message field 1370 for requesting a reset of the RPMB region. It will be well understood that '000Ah' indicating the message type 1372 can be set with any other arbitrary code value. In addition, an initialization level 1374 value may be newly set in a field in which the address/LUN of the message field 1370 is set. When the number of initialization levels is three, it can be set in the range of '0000h' to '0002h', but it will be well understood that the number of initialization levels (Init. Level) can be varied.

FIG. 15 is a diagram illustrating a method of setting a lock of an RPMB master region according to some embodiments of the inventive concept. Referring to FIG. 15, the host 1100 may set a lock for a master key already programmed in the RPMB master region 1213.

In block S410, the host 1100 transmits a command to request setting a lock or master key lock for the RPMB master region 1213 to the storage device 1200. The host 1100 may request a lock of the RPMB master region 1213 using a query request.

In block S420, the storage device 1200 sets a lock for the RPMB master region 1213 in response to the RPMB master region lock request. That is, as shown in FIG. 7 described above, the storage device 1200 changes the set value of the 'bRpmbMasterRegLock' property of the RPMB master region 1213 from the default value '00h' to '01h' according to the RPMB master region lock request.

In block S430, the storage device 1200 transmits a query response indicating success to the lock request of the RPMB master region 1213 to the host 1100.

Blocks S440 to S470 are example operations that illustrate the response of the storage device 1200 when the master key program is requested after the RPMB master region 1213 is locked.

In block S440, the host 1100 generates a new master key. At this time, the generated master key may be the same as the master key currently programmed in the RPMB master region 1213 or may be a different key. Host 1100 may generate a master key using secure element 1130 (see FIG. 2). The host 1100 generates a command requesting a program operation of the RPMB master region 1213 for the generated master key.

In block S450, the host 1100 transmits a command requesting programming of the generated master key to the RPMB master region 1213 of the storage device 1200. At this time, a program request message for the master key may be transmitted using the 'SECURITY PROTOCOL OUT' command of the UFS protocol. Master key programming is performed through an Authentication Key Programming Request for RPMB. At this time, the 'SECURITY PROTO-COL SPECIFIC' field of the command may include a code value indicating that the program is directed to the RPMB master region 1213 (e.g., '04h').

In block S460, the storage device 1200 checks the lock setting state of the master key or RPMB master region 1213 in response to the master key program request. The storage device 1200 may check the value of 'bRpmbMasterRegLock' already set in block S420 as '01h' indicating a locked state.

In block S470, the storage device 1200 transmits a command response indicating a program failure to the host 1100.

In the above, the lock setting procedure of the master key or RPMB master region 1213 according to an embodiment of the present inventive concept has been described as an example. By locking the RPMB master region 1213, the master key program itself can be blocked after locking the RPMB region 1211.

The above are specific embodiments for carrying out the present inventive concept. In addition to the above-described embodiments, the present inventive concept may include simple design changes or easily changeable embodiments. In addition, the present inventive concept will include techniques that can be easily modified and implemented using the embodiments. Therefore, the scope of the present inventive concept should not be limited to the above-described embodiments, and should be defined by the claims and equivalents of the claims of the present inventive concept.

What is claimed is:

1. A method for managing a replay protected memory block (RPMB) of a storage device, comprising:
    allocating an RPMB master region, which is managed separately from an RPMB region in which an RPMB key is stored, in the RPMB of the storage device;
    programming a master key into the RPMB master region responsive to a request from a host;
    receiving a reset request for the RPMB region using the master key from the host;
    resetting the RPMB key in response to the reset request for the RPMB region; and
    receiving a reset lock request for the RPMB region from the host.

2. The method of claim 1, wherein an attribute for indicating whether the RPMB master region is locked has a one-time write characteristic.

3. The method of claim 1, wherein the master key and a write counter of the master key are stored in the RPMB master region.

4. The method of claim 1, wherein the reset request for the RPMB region comprises:

requesting, by the host, a value of a write counter of the master key to the storage device; and transmitting, by the host, a reset command for the RPMB region including a first message authentication code generated by combining the value of the write counter of the master key and the master key to the storage device.

5. The method of claim 4, wherein the resetting the RPMB key comprises:

generating, by the storage device, a second message authentication code using the master key programmed in the RPMB master region and the write counter; and performing a reset on the RPMB region based on a comparison result between the first message authentication code and the second message authentication code.

6. The method of claim 5, wherein the resetting of the RPMB region includes an operation of deleting the RPMB key stored in the RPMB region.

7. The method of claim 1, further comprising:

receiving a master region lock request for blocking a program operation into the RPMB master region.

8. The method of claim 7, further comprising:

setting, by the storage device, an attribute of the RPMB master region to a locked state according to the master region lock request.

9. The method of claim 1, wherein the reset request for the RPMB region includes an initialization level of the RPMB region, and a reset range of the RPMB region, which is selected according to the initialization level.

10. The method of claim 9, wherein the reset of one or more of the RPMB key, a write counter of the master key, and RPMB data is determined according to the initialization level.

11. The method of claim 9, wherein the reset request for the RPMB region includes a query request for the initialization level supported by the storage device.

12. A storage device comprising:

a non-volatile memory device; and a storage controller configured to access the nonvolatile memory device responsive to a request of a host, wherein the storage controller is configured to divide and manage a replay protected memory block (RPMB) of the nonvolatile memory device into an RPMB region in which an RPMB key is stored and an RPMB master region in which a master key is stored, and wherein the storage controller is configured to program the master key in the RPMB master region responsive to a request from the host and to reset the RPMB region in response to a reset request from the host for the RPMB region based on the master key.

13. The device of claim 12, wherein the storage controller is configured to support an initialization level defining a reset range of the RPMB region, and to provide the initialization level to the host responsive to a request from the host.

14. The device of claim 13, wherein the initialization level includes:

a first initialization level for resetting the RPMB key stored in the RPMB region;

a second initialization level for resetting the RPMB key and a write counter of the RPMB key; and and a third initialization level for resetting the RPMB key, the write counter, and RPMB data stored in the RPMB region.

15. The device of claim 12, wherein the storage controller is configured to receive a reset lock request for the RPMB region based on the master key from the host, and to block reset of the RPMB region in response to the reset lock request.

16. The device of claim 12, wherein the storage controller is configured to receive a master region lock request for blocking a program operation into the RPMB master region.

17. The device of claim 16, wherein the storage controller is configured to set an attribute of the RPMB master region to a locked state in response to the master region lock request.

18. A management method of a replay protected memory block (RPMB) of a storage device, comprising:

allocating an RPMB master region managed separately from an RPMB region in which an RPMB key is stored in the RPMB of the storage device;

programming a master key in the RPMB master region responsive to a request of a host;

requesting, by the host, to reset the RPMB region of the storage device using the RPMB master key; and setting a reset lock to block resetting of the RPMB region responsive to a request of the host.

19. The method of claim 18, wherein the storage device applies a reset range of the RPMB region according to an initialization level, the method further comprising:

providing, by the storage device, the initialization level to the host responsive to an initialization level inquiry request of the host.

20. The method of claim 18, further comprising:

setting, by the storage device, an attribute of the RPMB master region to a locked state responsive to a request for locking the master region from the host.

\* \* \* \* \*